United States Patent [19]

Markiewicz et al.

[11] Patent Number: 5,450,303
[45] Date of Patent: Sep. 12, 1995

[54] ADJUSTABLE LAMP ASSEMBLY

[75] Inventors: John B. Markiewicz, Euclid; Gene L. Insley, Chagrin Falls; Paul R. Metcalfe, Bentleyville Village, all of Ohio

[73] Assignee: Lamson & Sessions Co., Cleveland, Ohio

[21] Appl. No.: 203,434

[22] Filed: Mar. 1, 1994

[51] Int. Cl.6 .............................................. F21V 21/26
[52] U.S. Cl. ................... 362/419; 362/427; 248/183.2
[58] Field of Search ............... 362/418, 419, 427, 457; 248/278, 279, 183; 403/93, 96, 97

[56] References Cited

U.S. PATENT DOCUMENTS

| | | | |
|---|---|---|---|
| 963,913 | 7/1910 | Lyhne | 403/97 |
| 1,364,748 | 1/1921 | Gray et al. | |
| 1,410,325 | 3/1922 | Kupferman | |
| 1,486,568 | 3/1924 | Debs | |
| 1,592,915 | 7/1926 | Webb | 248/278 |
| 2,278,356 | 3/1942 | Livingston | 248/278 |
| 2,355,922 | 8/1944 | Minero | |
| 2,395,178 | 2/1946 | Fiori | |
| 2,587,917 | 3/1952 | Stone | |
| 4,090,210 | 5/1978 | Wehling et al. | 248/278 |
| 4,543,007 | 9/1985 | Quiogue | 403/97 |
| 4,609,979 | 9/1986 | Kristofek | 362/427 |
| 4,760,511 | 7/1988 | Russello et al. | 362/427 |
| 4,917,343 | 4/1990 | Wainscott | 403/97 |

Primary Examiner—Ira S. Lazarus
Assistant Examiner—Sara Sachie Raab
Attorney, Agent, or Firm—Fay, Sharpe, Beall, Fagan, Minnich & McKee

[57] ABSTRACT

An adjustable lamp assembly comprises a PAR type lamp housing an a mounting base for supporting the housing. A mechanical adjusting assembly interconnects the housing and the mounting base for permitting selective adjustment of the housing relative to the base about first and second axes lying in respective planes located at approximately 90° relative to one another. The adjusting assembly includes an intermediate support member connected between the housing and the base with first connecting assembly joining the intermediate support member to the base and a second mechanical connecting assembly joining the intermediate support member to the housing. The first and second connecting assemblies each including separate first and second spring biased circular arrays of teeth-like members selectively movable axially along the respective first and second axes between locked positions and adjustment positions wherein selective rotary adjustment about the respective axis is permitted.

6 Claims, 3 Drawing Sheets

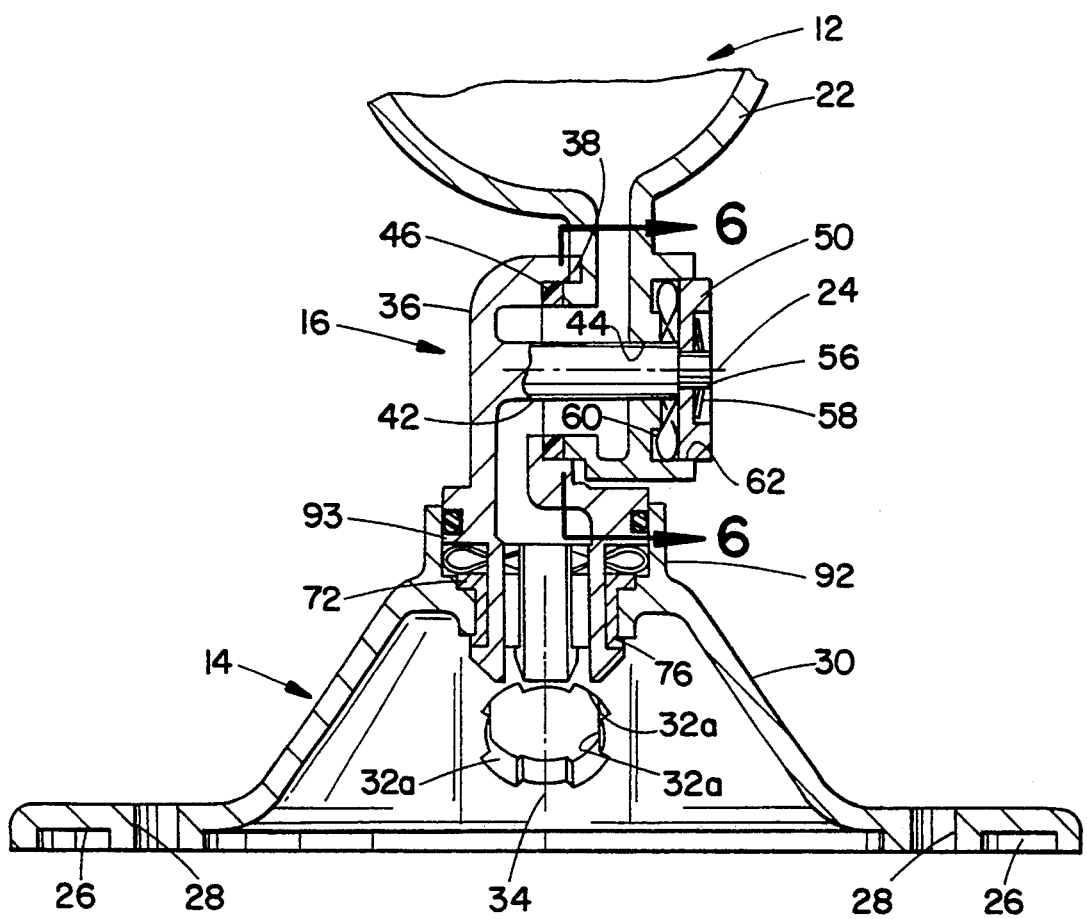
FIG. 2
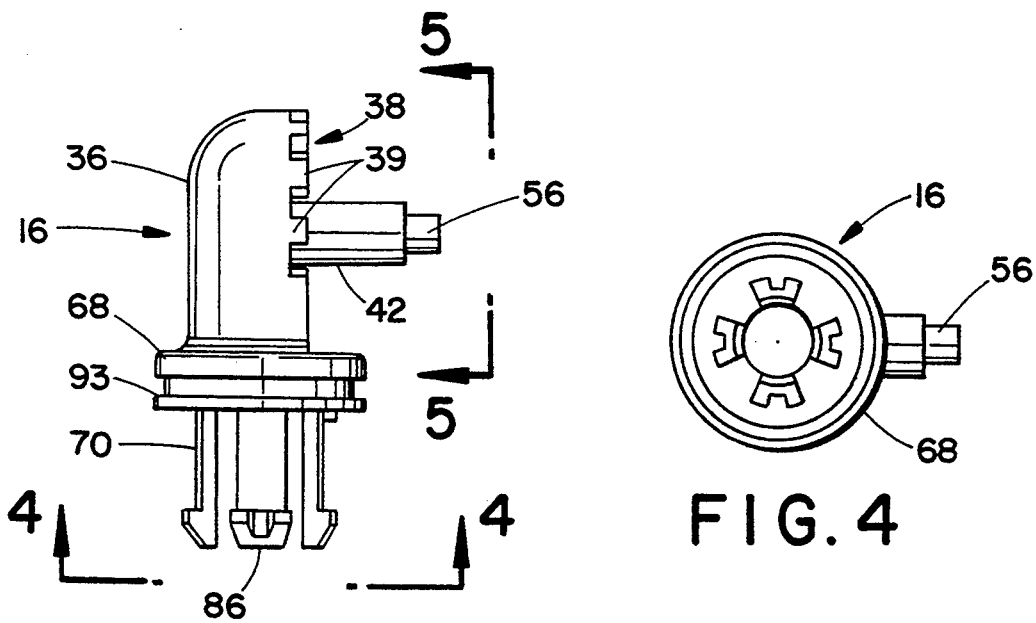
FIG. 3
FIG. 4

5,450,303

ADJUSTABLE LAMP ASSEMBLY

BACKGROUND OF THE INVENTION

The subject invention is directed toward the lamp art and, more particularly, to a lamp that can be selectively adjusted relative to its base by simple manual manipulation.

Lamps designed for allowing adjustment of the angle or direction of projection of the lamp relative to its base are well known. Such adjustable designs have generally relied on clamped or bolted connectors that have been difficult to adjust and/or difficult to maintain in an adjusted position. In addition, many of the prior art units have been capable of being adjusted in only one plane.

SUMMARY OF THE INVENTION

The subject invention provides an adjustable lamp assembly which overcomes the problems and difficulties noted above and allows quick manual adjustment of the position of the lamp holder portion of the assembly relative to the mounting base without the use of tools. In its preferred form, the assembly allows the position of the lamp to be adjusted about either or both of two separate axes which lie in planes located at 90° relative to one another. In accordance with the preferred form, the adjustable lamp assembly of the invention comprises a lamp housing and an associated mounting base for supporting the housing from an associated structure. First adjusting means interconnect the housing and the base for permitting angular adjustment of the housing relative to the base about a first axis. The first adjusting means include first and second opposed sets of teeth-like elements with at least one set positioned in a circular array about the first axis. Spring means act to bias the sets of teeth into an engaged first position for preventing angular movement of the housing about the first axis while permitting selective manual movement of at least one of the sets in a direction against the bias to a disengaged second position for allowing angular adjustment of the housing relative to the base. Preferably, each set of the teeth-like members includes a multiplicity of teeth located in a circular array about the first axis and the first of the sets of teeth-like elements is mounted for movement in axial direction along the first axis. Preferably, the first of the sets of teeth-like elements is carried by a support element and is constrained against rotary movement about the first axis.

In accordance with a still further and more limited aspect of the invention, the assembly preferably includes second adjusting means arranged in association with the first adjusting means for permitting angular adjustment of the housing relative to the base about a second axis lying in a plane that is generally perpendicular to the first axis. The second adjusting means preferably comprise interengaging locking means for maintaining the housing in any of a plurality of selected positions of adjustment about the second axis.

In accordance with a still further aspect of the invention, the first and second adjusting means are located at opposite ends of an intermediate support member which connects the housing with the base. The intermediate support member is preferably manually latched to the base by a plurality of spring finger members which extend through an opening in the base. The spring fingers define one-half of the interengaging locking means.

As can be seen from the foregoing, a primary object of the invention is the provision of an adjustable lamp assembly which uses spring biased interengaging teeth-like members for providing selective adjustment of the housing relative to the base about one or more axes of adjustment.

A further object of the invention is the provision of an assembly of the type described wherein adjustment of the lamp housing relative to the support base can be achieved by manually moving the components to a disengaged position and then rotating them to a selected position of adjustment and re-engaging the latch elements.

Another object of the invention is the provision of an apparatus of the general type described wherein adjustment can take place about either of two different axis located in planes which intersect one another at approximately 90°.

BRIEF DESCRIPTION OF THE DRAWINGS

The above and other objects and advantages will become apparent from the following description when read in conjunction with the accompanying drawings wherein:

FIG. 2 is a partial vertical cross-sectional view through the apparatus shown in FIG. 1;

FIG. 3 is a side elevational view of the intermediate support arm portion of the FIG. 1 assembly disconnected from both the base and the lamp housing;

FIG. 4 is an end view of the lamp support arm element taken on line 4—4 of FIG. 3;

FIG. 10 is an enlarged view taken on line 10—10 of FIG. 1 with a latch element removed so as to show an interior portion of the adjusting mechanism;

FIG. 11 is a view taken on line 11—11 (the view is taken with the support arm and insert member removed from the base element to show the interior details of the arm receiving opening in the base member); and, FIG. 12 is a vertical cross-sectional view through an adapter useful for allowing retro-fit of the assembly to standard threaded bases.

DETAILED DESCRIPTION OF THE PREFERRED EMBODIMENT

Figure 1:
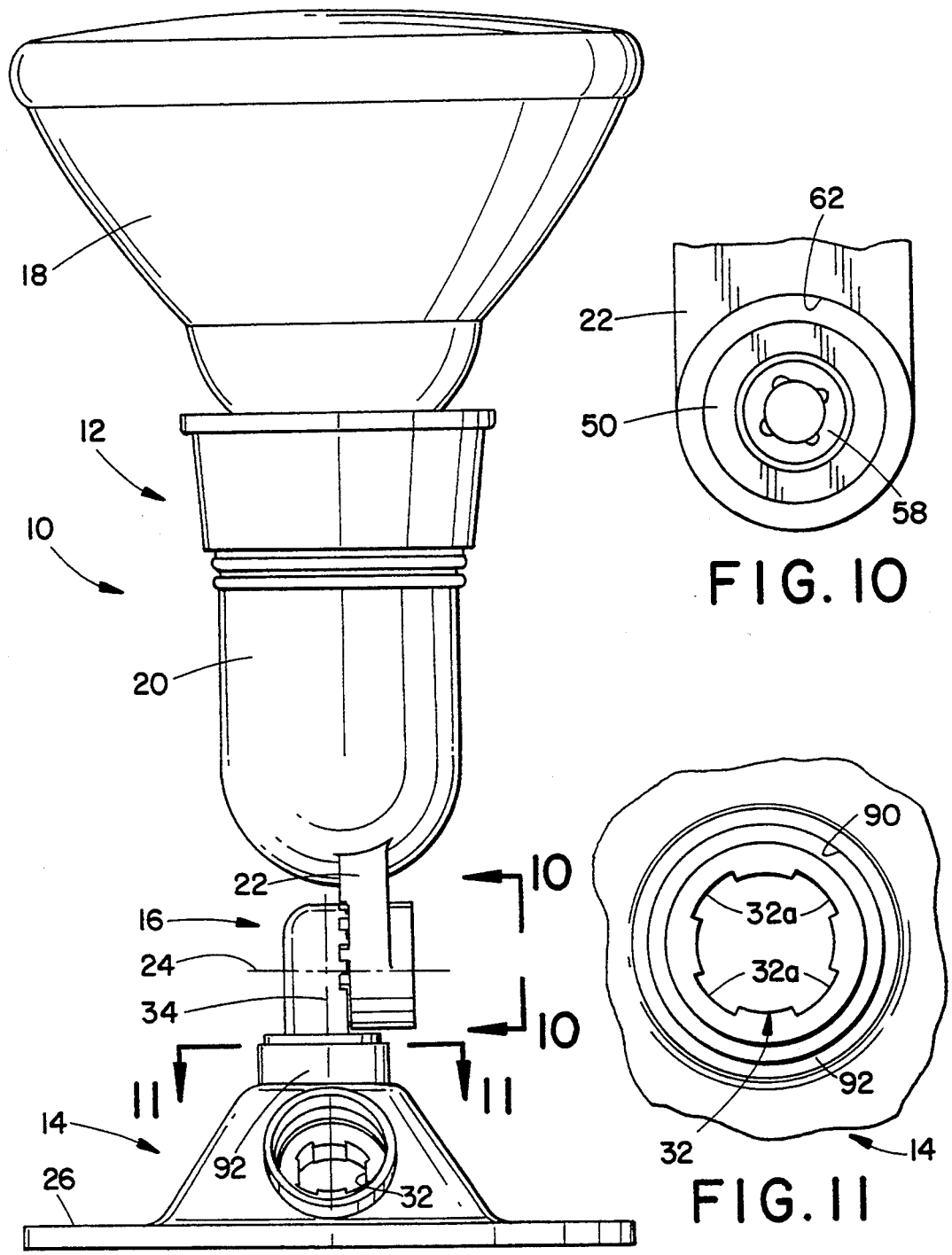
FIG. 1 is a side elevational view of the preferred embodiment of the invention.

Referring more particularly to the drawings wherein the showings are for the purpose of illustrating a preferred embodiment of the invention only and not for the purpose of limiting same, FIG. 1 shows the overall arrangement of the preferred form of adjustable lamp assembly 10 formed in accordance with the subject invention and generally comprising a lamp housing 12 adjustably carried from a support base 14 by a support arm 16.

The lamp housing 12 has a relatively conventional cup-like shape and is formed from any suitable material which could, of course, be metal, plastic, or a structural ceramic. Preferably, according to the subject embodiment, the housing 12 is a molded plastic component of a suitable impact-resistant, high density plastic. The housing encloses a bulb receiving socket (not shown) which releasably receives and holds a conventional lamp bulb 18. The bulb 18 is preferably of the well known PAR type that includes a Polycrystalline Aluminum Reflective layer on the bulb housing so that a separate reflector is not required in the assembly. The housing 12 further includes the previously-mentioned cylindrical cup-shaped body portion 20 and a lower connecting end portion 22 that is connected to the support arm 16 for selective adjustment about a transversely extending first axis 24.

Base 14 can also be formed from any suitable material having the requisite structural strength required to mount and support the housing 20 and the lamp or bulb element 18. In the subject embodiment, the base 14 (see FIG. 2) is a one-piece molded structure having a radially extending base flange 26 provided with a plurality of fastener-receiving mounting openings 28. An upwardly extending domed portion 30 is suitably provided with openings which receive and adjustably mount the support arm 16 in a manner subsequently to be described. For the present, however, it should be noted that the dome portion 30 of base 14 can have any number of selectively usable mounting openings 32 located on one or more sides of the domed area so that one or more support arms and associated housings and lamps can be mounted therefrom as desired. Preferably, the connection between the support arm 16 and the openings 32 is such that selective angular adjustment of the support arm and associated lamp housing 12 can take place about a second axis extending axially of the support arm and lying in a plane perpendicular to the plane that includes the first axis 24. In the FIG. 1 showing, the second axis of adjustment is generally indicated by the line identified as 34.

Figure 5:
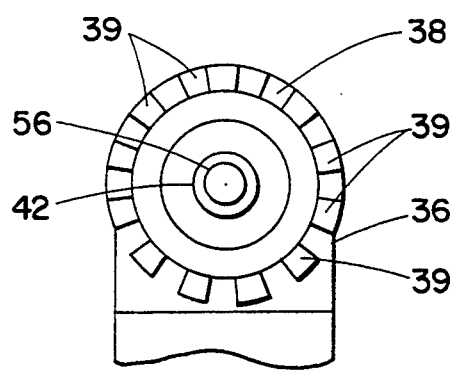
FIG. 5 is a cross-sectional view taken on line 5—5 of FIG. 3 showing the tooth-like elements used in one of the adjustment mechanisms of the FIG. 1 embodiment.
Figure 6:
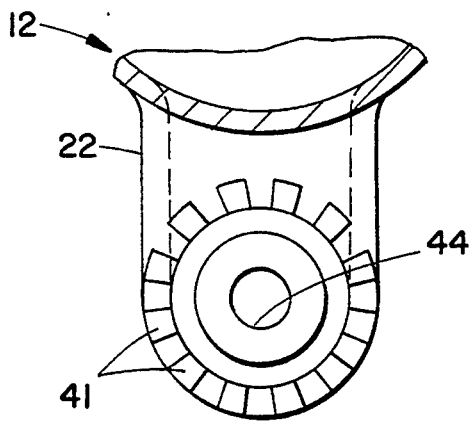
FIG. 6 is a cross-sectional view taken on line 6—6 of FIG. 2.

The first adjusting means provides a connection between the lower end portion 22 of the housing 12 and the outer or upper end portion (as viewed in FIGS. 1 and 2) of the support arm 16. This connection and the first adjusting means in its preferred form can best be understood by reference to FIGS. 2, 3, 5, 6, and 10. In particular, as shown in FIGS. 2, 3, and 5, the support arm 16 includes a main body portion 36 that is hollow and includes a cylindrical flange portion 38 that extends therefrom axially to the right (as viewed in FIG. 2). The cylindrical flange 38 is provided with a circular array of tooth-like elements 39 sized and arranged to be adapted to engage with corresponding tooth-like elements 41 formed in a circular array about the lower end portion 22 of the housing 12. Also, extending from the interior of the support arm 16 to the right in central axial alignment with the flange 38 is a main central support axle or pin 42. Pin 42 and flange 38 are located concentrically with axis 24 as their center. It should be noted in FIG. 2 that the pin 42 extends through a corresponding opening 44 formed in the wall of the lower portion 22 of housing 12. Housing 12 is thus supported by the flange 38 and the pin 42 for rotary movement thereabout with axis 24 as the center of rotation. A resilient flexible seal member 46 is located centrally within the flange 38 to provide a seal and wiper for sealing between the support arm 16 and the housing 12.

The housing 12 is adapted to be adjustably locked in any desired position of rotation about the flange 38 and the pin 42 by a locking mechanism which includes the previously-mentioned tooth-like arrays 39, 41 and a disk-shaped member 50 that has the appearance of a thumb-button. However, it is fixedly joined to the outer free end 56 of the shaft 42 by a spring washer 58. It thus acts as a retainer or stop to hold the lamp housing 12 to support arm 16.

As can be seen in FIG. 2, a wave spring 60 is positioned about shaft 42 and acts between the housing end portion 22 and member 50 to maintain the lower portion 22 of housing 12 under a continual bias toward the arm 16. It will be noted that the housing end portion 22 includes an inwardly extending counterbore 62 that receives spring 60 and member 50 (see FIG. 10. When the components are in the FIG. 2 position, the interengagement between the teeth 39 and the teeth 41 prevents relative movement between the housing 12 and the support arm 16 about the axis 24. However, the spacing between the lower end 22 of housing 12 and the upper end of the support arm is such that the housing 12 can be moved to the right (as viewed in FIG. 2) against the bias of the spring 60 to disengage the interengaged tooth-like elements and permit manual selective adjustment or rotation of the housing about axis 24. The teeth can then be re-engaged by permitting the biasing spring to move the housing back to the left to the engaged or locked position illustrated. As can be appreciated, this adjustment can be made readily without the use of any special tools or without releasing any mechanical connectors such as screws or clamps. Additionally, the position of adjustment is maintained by a positive mechanical interengagement and does not rely on friction.

Figure 7:
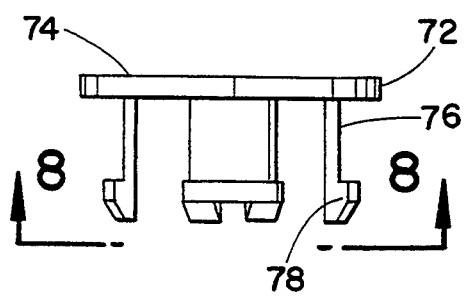
FIG. 7 is a side elevational view of an insert element used in the FIG. 1 embodiment.
Figure 9:
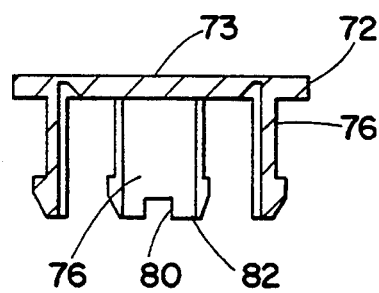
FIG. 9 is a cross-sectional view taken on line 9—9 of FIG. 8.
Figure 8:
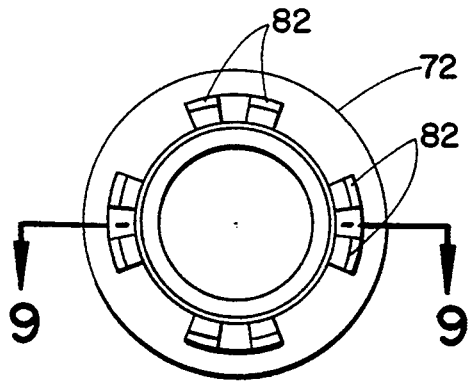
FIG. 8 is an end view taken on line 8—8 of FIG. 7.

As previously mentioned, the subject assembly also permits selective rotary adjustment of the housing and the support arm 16 about the axis 34 which lies in a plane which is preferably perpendicular to the plane that includes the axis 24. The mechanism by which this adjustment takes place includes a generally circular base 68 formed on the lower end of the support arm 16 (see FIGS. 3 and 4) and a plurality of resilient finger-like elements 70 which extend downwardly from the circular base 68. Positioned within the opening 32 of the base 14 for receiving the resilient legs 70 is an intermediate insert member 72. Member 72 is illustrated in detail in FIGS. 7 through 9. Generally, it includes a circular, annular flange portion 74 and four resilient downwardly extending legs 76 that terminate in radially extending tines or flange portions 78. The lower ends of the tines or end portions 78 are provided with inwardly extending recesses 80 so that a plurality of individual tooth-like members 82 result (see FIG. 8). The spacing and arrangement of the finger or resilient portions 76 are such that they are received in the radially extending recesses 32a of the opening 32 (see FIG. 11). When the element 72 is inserted into position in opening 32, it is latched therein and in combination therewith defines a series of axially extending teeth-like members and an annular array therefore teeth-like portions 82 which are thus defined around the lower end of the opening 32 are positioned and arranged so as to engage with and receive similar radially extending teeth-like portions 86 (see FIG. 3) which extend outwardly from the enlarged lower ends of the resilient finger portions 70 on the base of support arm 16. When the base 68 and the fingers 70 are moved into position in opening 32, the base 68 enters into a correspondingly-shaped recess 90 formed by an upwardly extending flange or collar 92 about opening 32. An O-ring is positioned in a groove 93 for sealing between arm base 68 and collar 92. In the inner located position of support arm 16 shown in FIG. 2, engagement between teeth portions 86 and 82 lock the support arm against rotation about axis 34. The components are maintained in this interengaged or locked position by a wave spring 92 which is positioned between the circular base 68 and the inner end wall of the recess 90 formed about opening 32 by flange or collar 92. So long as the wave spring 92 maintains the housing 12 and the support arm 16 biased axially outward on axis 34, the locked interengaged relationship is maintained. However, by forcing the support arm 16 axially inward on the base 14, the engagement between teeth portions 86 and 82 is released and selective rotation of the support arm about axis 34 can take place. Upon release of the force acting against the bias of spring 92, the outward movement of the support arm causes re-engagement between the teeth-like portions and locks the support arm and the housing in a new position of adjustment.

Although not significant with respect to the adjustment feature of the invention, the insert element 72 (see FIG. 9) preferably has a center knock-out plug 73 that allows it to plug unused openings 32 in base 14. When a support arm is to be installed therein, however, the plug 73 is driven out.

The support base elements in conventional prior PAR lamp assemblies typically connect with the support arm or the lamp housing through a threaded connection. That is, the prior support bases generally include a threaded opening into which the support arm is connected. In order to allow the adjustable support arm and lamp housing of the subject invention to be retrofitted into the prior support base elements, an adapter 96 as shown in FIG. 12 can be used.

Figure 12:
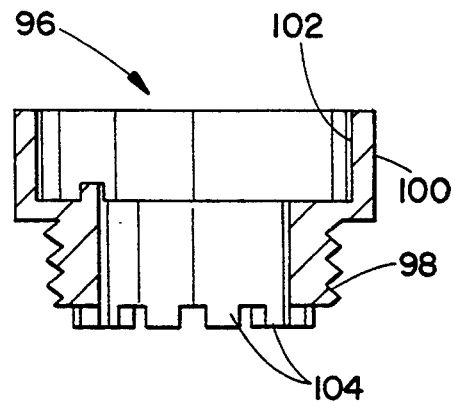

As shown in FIG. 12, the adapter 96 is of stepped diameter with a first threaded portion 98 and a second portion 100 of larger diameter. Portion 98 is exteriorly threaded and sized for receipt in the threaded mounting openings of the standard prior support bases. Portion 100 is defined by a circumferential flange 102 which is sized to allow receipt of base 68 of support arm 16 and generally corresponds to previously mentioned collar 92 of support base 14.

About the lower end of the portion 98 there is provided the tooth-like protrusions 104 that are laid out in a circular array to form recesses that engage with resilient legs 70. Thus, the adapter functions to allow a standard prior art base to accept the adjustable support arm and lamp housing of the present invention.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. An adjustable lamp assembly comprising:
a lamp housing;
a mounting base for supporting the housing;
adjusting means interconnecting the housing and the mounting base for permitting selective adjustment of the housing relative to the base about first and second axes lying in respective planes located at approximately 90° relative to one another, said adjusting means including an intermediate support member connected between the housing and the base with first connecting means joining the intermediate support member to the base and second connecting means joining the intermediate support member to the housing, the first and second connecting means each including separate first and second circular arrays of teeth-like members selectively movable axially along the respective first and second axes between locked positions and adjustment positions wherein selective rotary adjustment about the respective axis is permitted;
the first connecting means further including a plurality of resilient finger-like elements extending from a circular end on the intermediate support member through a mounting opening in the mounting base and terminating in radially extending portions that define the first circular array of teeth-like members, and cooperating recesses in the mounting opening for receiving the first circular array of teeth-like members; and,
spring means between the base member and the intermediate support member for biasing the intermediate support member outwardly of the mounting opening.

2. The adjustable lamp assembly as defined in claim 1 wherein the second connecting means includes an array of teeth-like members carried on the intermediate support member and cooperating with an array of corresponding teeth-like members carried by the lamp housing.

3. The adjustable lamp assembly as defined in claim 1 wherein the first connecting means includes an adapter member threadedly connected to the mounting base.

4. The adjustable lamp assembly as defined in claim 3 wherein the adapter member defines the said cooperating recesses in the mounting opening.

5. The adjustable lamp assembly as defined in claim 1 wherein the second connecting means includes spring means biasing the housing in a direction toward the said locked position.

6. The adjustable lamp assembly as defined in claim 1 wherein the mounting opening includes a circular recess that closely receives the circular end on the intermediate support member and the spring means between the base member and the intermediate support member being positioned within the circular recess.

* * * * *